United States Patent [19]

Reissmann

[11] Patent Number: 4,999,021
[45] Date of Patent: Mar. 12, 1991

[54] DEVICE FOR UNLOADING CONTAINERS

[76] Inventor: Ulrich Reissmann, Hauptstrasse 16, 3301 Gross Schweulper

[21] Appl. No.: 419,162

[22] Filed: Oct. 10, 1989

[30] Foreign Application Priority Data

Oct. 8, 1988 [DE] Fed. Rep. of Germany ....... 3834339

[51] Int. Cl.$^5$ ............................................. B65B 21/02
[52] U.S. Cl. ..................................... 474/415; 414/421; 414/363; 414/375; 222/161; 222/196; 298/1 V
[58] Field of Search ............... 414/415, 421, 363, 375; 222/161, 196; 298/1 V

[56] References Cited

U.S. PATENT DOCUMENTS

| | | | |
|---|---|---|---|
| 2,311,373 | 2/1943 | Durning | 222/161 X |
| 3,485,401 | 12/1969 | Meyer . | |
| 3,854,612 | 12/1974 | Snape | 414/415 |
| 4,310,106 | 1/1982 | Greck et al. | 414/415 X |
| 4,363,589 | 12/1982 | Rozwadowski et al. | 414/421 X |
| 4,449,880 | 5/1984 | Hartman | 414/421 |

FOREIGN PATENT DOCUMENTS

| | | | |
|---|---|---|---|
| 0010182 | 9/1979 | European Pat. Off. . | |
| 0282958 | 9/1988 | European Pat. Off. . | |
| 869471 | 1/1953 | Fed. Rep. of Germany . | |
| 884626 | 8/1953 | Fed. Rep. of Germany | 222/161 |
| 2950050 | 7/1981 | Fed. Rep. of Germany | 222/196 |
| 3644811 | 7/1988 | Fed. Rep. of Germany . | |
| 1531046 | 9/1988 | Fed. Rep. of Germany . | |
| 3429167 | 9/1988 | Fed. Rep. of Germany . | |
| 305838 | 11/1968 | Sweden | 414/415 |
| 1052873 | 11/1983 | U.S.S.R. | 222/196 |
| 2076934 | 12/1981 | United Kingdom . | |

OTHER PUBLICATIONS

Wehmeier, "Schwingleiderrinhen-Eine Systematik der Bauformen and ihrer Eigenarten", Fördern und Heben, 1964, Heft 3, p. 155.
Kuschel, "Probleme der modernen Vibrations f/örderung", Industrie-Anzeiger, 87 Jg. No. 2, Jan. 5, 1965, pp. 15–16.
Kuschel, "Probleme der modernen Vibrationsförderung", Industrie-Anzeiger, 87, Jg. No. 11, Feb. 5, 1965, p. 170.
"Elektromagnetische Schwingförderung Neuentwickelte Dosiergeräte", Deutsche Hebe-und Fördertechnik 1/71, p. 107.
"Amplitudenregelung an Vibrationswendelf/örderern hält Leistung konstsnt", Maschinemarkt, Würzburg 90, 1984, 37, pp. 917–918.
"Rinnenaus Lenkung bei Vibrationsfördergeraten elektronisch geregelt", Maschinemarkt, Würzburg 90, 1984, 12. p. 220.
"Resonanz-Vibrationssteuerungals eine Möglichkeitzum", Energie einsparen, Maschinemarkt, Würzburg 92, 1986, 49, pp. 18–21.

*Primary Examiner*—Frank E. Werner
*Attorney, Agent, or Firm*—Foley & Lardner

[57] ABSTRACT

For the continuous dosed unloading of bulk piece goods from containers, especially containers whose weight in the loaded state is many times the weight when empty, the device has the following features:

(a) a stationary machine frame;
(b) a vibrating frame which is movable with respect to the machine frame;
(c) devices for connecting said machine frame and said vibrating frame;
(d) a receiving platform which is provided on the vibrating frame and has devices for securing the containers on the receiving platform;
(e) a low-frequency vibration drive arranged at an incline with respect to the vibrating frame for vibrating the vibrating frame; and
(f) the vibration device regulating the vibration amplitude in a predetermined amplitude range limiting the vertical acceleration component of the vibration to about 2 g.

8 Claims, 4 Drawing Sheets

DEVICE FOR UNLOADING CONTAINERS

BACKGROUND OF THE INVENTION

This invention relates to a device for unloading containers loaded with bulk piece goods, especially containers whose weight in the loaded state is many times the weight when empty.

The known technique for unloading standard containers, for example Euro skeleton boxes, holding parts required in a manufacturing process is carried out with the aid of magnets, if the parts are magnetizable, or by tipping out the containers. Since in the loaded state containers have a weight of several tons, a costly lifting device is necessary for the tilting. Unloading is in this case complete, so that a dosed emptying is virtually impossible. This is also true of the magnetic removal, with which the container does not need to be emptied completely, but a true dosing in the form of a continuous even supply is also not possible. Moreover, all known emptying methods create a considerable noise disturbance.

SUMMARY OF THE INVENTION

It is therefore an object of the present invention to provide a device for unloading containers loaded with bulk piece goods which permits a low-noise and continuously dosed emptying of the containers.

In accomplishing the foregoing object, there has been provided according to the invention a device, which comprises:
(a) a stationary machine frame;
(b) a vibrating frame which is movable with respect to the machine frame;
(c) means for connecting the machine frame and the vibrating frame;
(d) a receiving platform which is provided on the vibrating frame and has means for securing the containers on the receiving platform;
(e) a low-frequency vibration drive arranged at an incline with respect to the vibrating frame for vibrating the vibrating frame; and
(f) the vibration drive regulating the vibration amplitude in a predetermined amplitude range and limiting the vertical acceleration component of the vibration to about 2 g.

Further objects, features and advantages of the invention will become apparent from the detailed description of preferred embodiments that follows, when considered together with the attached figures of drawings.

DETAILED DESCRIPTION OF THE PREFERRED EMBODIMENTS

Figure 1:
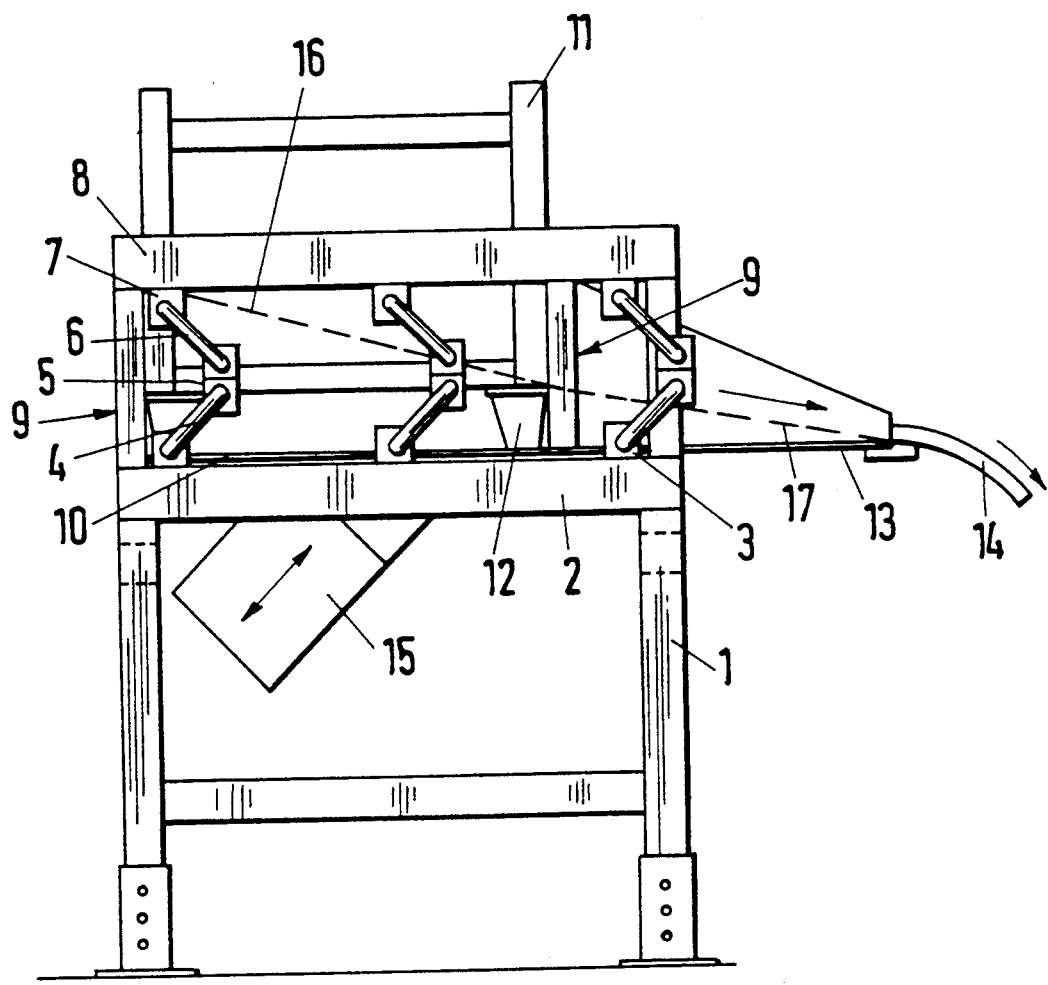
FIG. 1 shows a side view of an unloading device for containers unloadable in the base region.

With the device according to the present invention, the containers are emptied with a vibration drive known from vibration conveyors. While prior vibration conveyors acted directly on the parts to be conveyed and regularly caused micro-projections of these parts, in the device according to the present invention the vibration is exerted on an entire mass of bulk piece goods in the container, possibly far removed from the vibrating platform. For the application of the vibration technique to the emptying of containers, marginal conditions must be fulfilled which permit the possible handling of greater weights and weight differences. This includes a low-frequency excitation of the vibrating frame, the regulation of the vibration amplitude and the limitation of the acceleration in vertical direction to about 2 g. In the case of vibration conveyors, a low-frequency excitation is taken to mean an excitation with a frequency lying clearly below the prior conventional excitation frequency of about 50 Hz or 60 Hz. Excitation preferably occurs between about 10 Hz and 20 Hz. The regulation of the vibration amplitude permits a constant operation even in the case of greatly varying effective masses, resulting in the possibility of a continuous dosed emptying of the container. The limitation of the vertical acceleration component permits a controlled governing of even large weights and the use of conventional holding devices of small dimensions for the containers, since the forces moving the container itself are small. If the vertical acceleration component is limited to about g in a preferred embodiment, in principle a relative container movement with respect to the receiving platform no longer takes place at all and the holding devices could in fact be omitted. Nevertheless, the holding devices are provided for safety reasons. However, they need not be dimensioned to absorb great forces.

It is advantageous if it is also possible to adjust the frequency automatically to the changing effective mass. In a particularly preferred embodiment, the vibration excitation occurs at the resonant frequency of the effective mass. Since the resonant frequency varies constantly during emptying of the container, the vibration frequency is constantly adjusted.

The device according to the present invention is suitable for unloading conventional containers which can be opened on their underside in a container side wall, so that emptying is carried out via the container base, which is at an incline if appropriate. The device according to the invention can, however, also be used for a tilting emptying from containers open at the top if it is provided with a tilting frame which is arranged in the vibrating frame, is tiltable relative to the vibrating frame by means of a hydraulic cylinder about a swivel joint fastened to the vibrating frame, and has the receiving platform and the holding devices. In this embodiment, the tilting device is located on the vibrating frame, and is thus subjected to the vibrations which effect the emptying. The hydraulic cylinder acts in this case in the frequency range in question as a rigid part.

It is advantageous to use a two-mass vibrator fastened to the vibrating frame, and to provide a vibration-decoupled linkage between the vibrating frame and the machine frame. In this manner the machine frame is freed of vibrations to a large extent.

The regulation of the vibration amplitude and the acceleration of the effective mass which is used within the framework of the present invention is known for a vibration conveyor from German Offenlegungsschrift 3,644,811. In the present invention, however, the regulating mechanism has the function of limiting the vibration excited at the resonant frequency of the effective mass and keeping it controllable. In this arrangement, a compensation by the regulation for large mass changes is not envisaged.

The invention will be described in greater detail below with reference to exemplary embodiments illustrated in the drawings.

Figure 2:
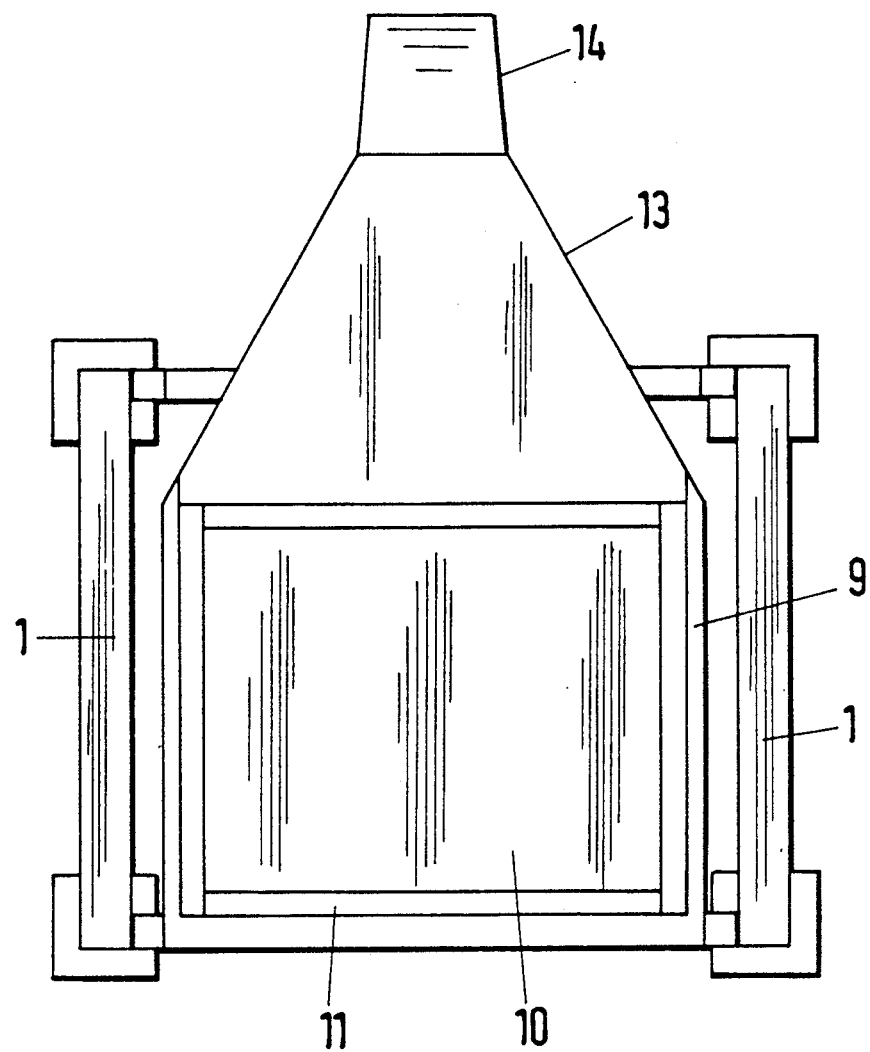
FIG. 2 shows a plan view of the arrangement according to FIG. 1.

The device illustrated in FIGS. 1 and 2 has a fixed machine frame 1 which is completed on its top side by traverses 2. Flexible joints 3, in which in each case a guide rod 4 can be rotated against a restoring force, are located on the top side of the traverses. The upper ends of the guide rods 4, which point upwardly inclined approximately at an angle of about 45° from the traverse 2, are mounted in a double-joint block 5, in which the upper guide rods 6 also end, which form with the lower guide rods 4 in each case a pair of guide rods 4, 6. The upper guide rods 6 are mounted in upper flexible joint blocks 7, which are fastened to an upper traverse 8 of a vibrating frame 9. The vibrating frame 9 is connected to the machine frame 1 only via the vibration-damping guide rod linkages 3 to 7. The vibrating frame has a receiving platform 10, on which a standard container 11 with feet 12 stands. The receiving platform 10 continues on one side into a discharge chute 13, which tapers toward its free end in the manner of a funnel and merges into a narrow delivery channel 14.

Fastened to the underside of the vibrating frame 9 is a vibration drive 15 having a conventional mass-spring system as well as a counter-mass. By virtue of the counter-mass, the vibration drive 15 is in a position to set the vibrating frame 9 vibrating, although it is not mounted on a fixed frame, such as the machine frame 1, for example. In the exemplary embodiment illustrated, the vibration drive 15 is at an angle about 45° to the vertical and thus excites the vibrating frame 9 and the receiving platform 10 connected thereto to vibrate in this direction. The parts contained in the container 11 are subject to a correspondingly directed-in acceleration, so that the parts run against a front container wall.

In the exemplary embodiment illustrated, the container 11 is open for a base emptying. In addition, it has, for aiding the emptying, a sloping base 16, which continues in a sloping base 17 of the discharge funnel 13. Owing to the sloping excitation of the vibrating frame 9 by the vibration drive 15, however, it is also readily possible to empty a container 11 with a horizontal base. The sloping base 16 merely speeds up the emptying process.

By virtue of a regulation (not shown) of the vibration amplitude and the acceleration of the effective mass formed by the vibrating frame 9, the container 11 and its contents, a controlled and continuous unloading of the container 11 is achieved during the entire unloading process, in which the mass of the container is reduced from about 1 or 2 t to about 75 kg, for example, if a Euro skeleton box, for example, of heavy parts such as screws or the like is emptied.

Figure 3:
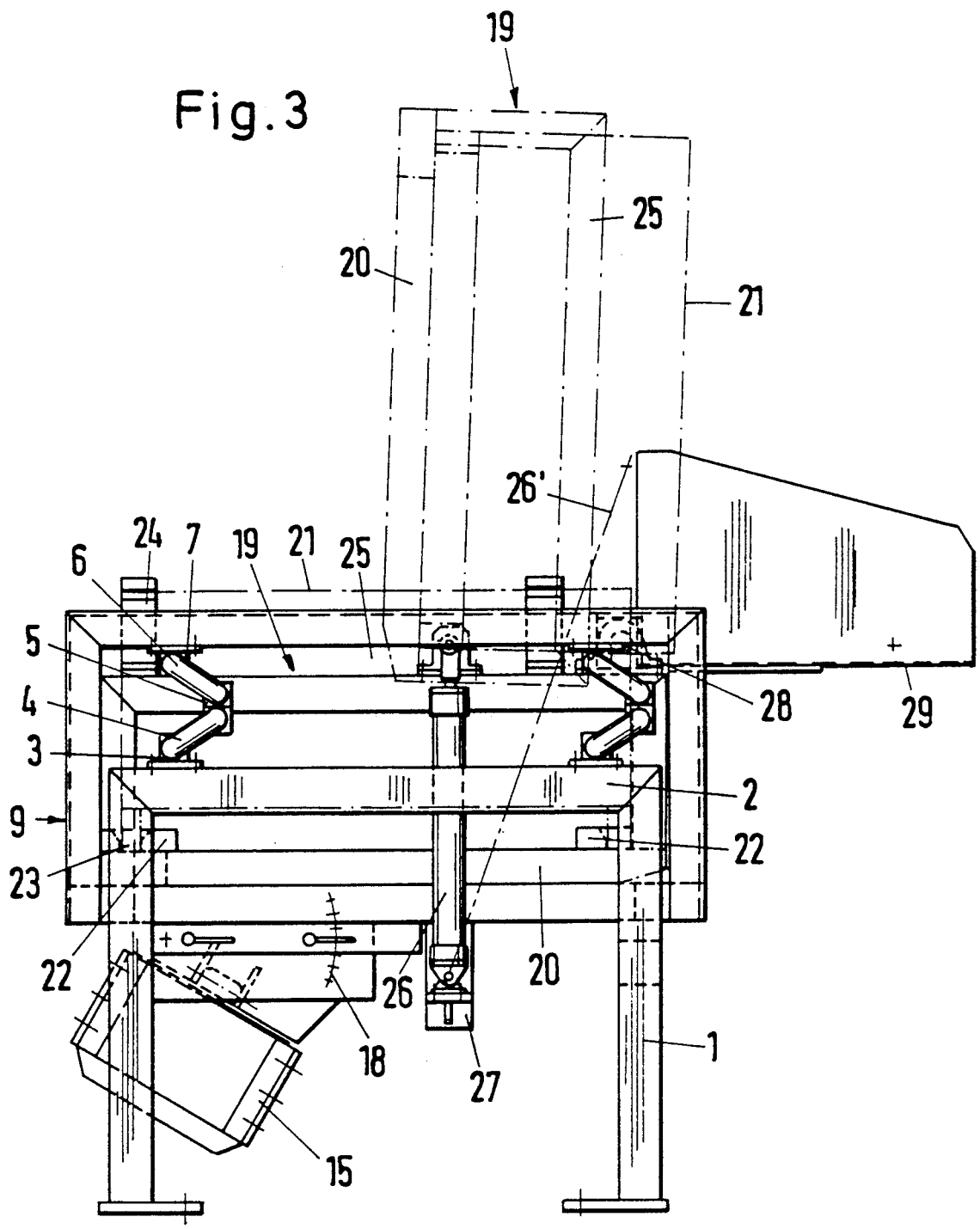
FIG. 3 shows a side view of an unloading device with a tilting device.
Figure 4:
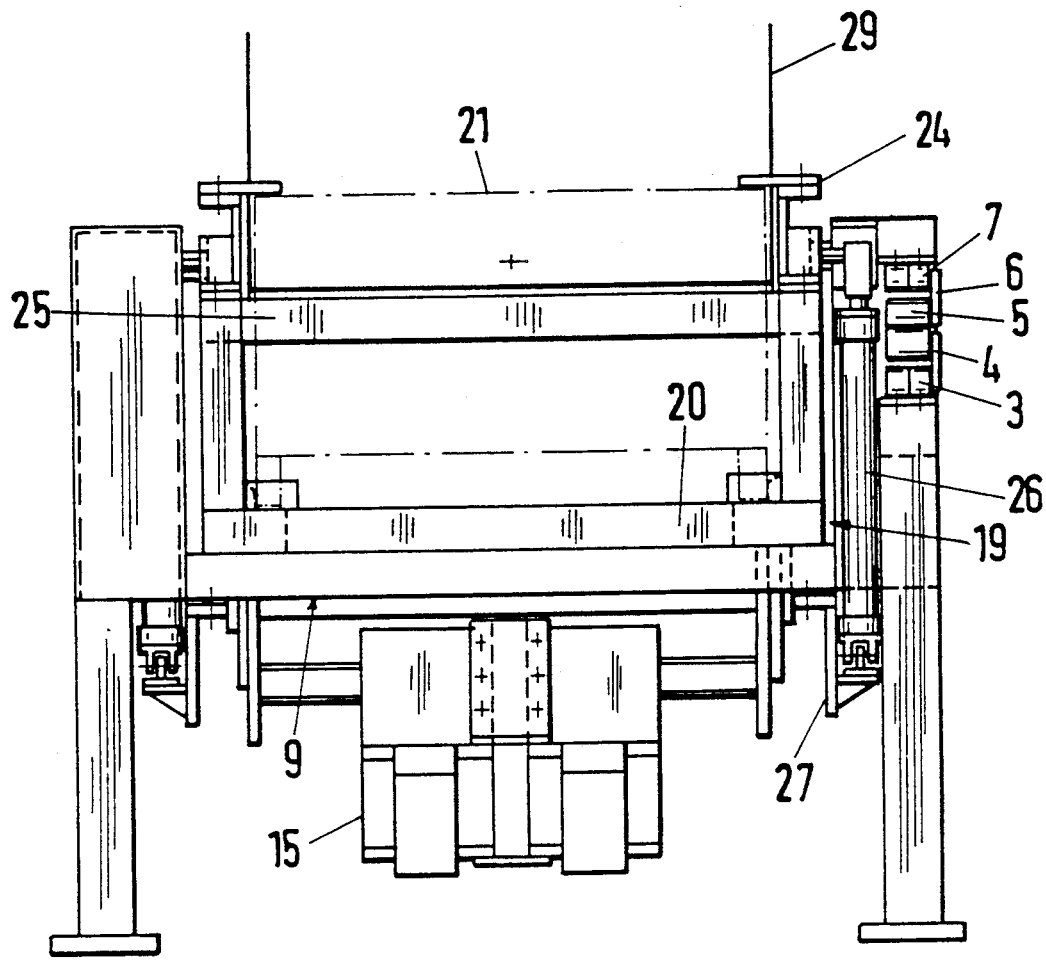
FIG. 4 shows a rear view of the device according to FIG. 3.

The arrangement illustrated in FIGS. 3 and 4 likewise has a machine frame 1, which is completed at its top side by traverses 2. A vibrating frame 9 is connected to the machine frame 1 via an identical vibration-damping linkage 3 to 7. A vibration drive is fastened to the underside of the vibrating frame 9. A scale 18 indicates that the angle of inclination of the vibration drive 15 with respect to the vertical or with respect to the base of the vibrating frame 9 is adjustable.

Arranged within the vibrating frame 9 is a tilting frame 19, on the base 20 of which a container 21 is mounted, indicated with dot-dashed lines. Elevations 22 for receiving container feet 23 are provided centered on the base 20. The container is held at the top side by clamping jaws 24 which are fastened to an upper traverse 25. In each case on two opposite side a hydraulic cylinder 26 is likewise connected rotatably to the upper traverse 25, the lower end of which hydraulic cylinder is rotatably pivoted on a side bar 27 of the vibrating frame 9. The upper traverse 25 of the tilting frame 19 is furthermore connected to the vibrating frame at a front end of the vibrating frame 9 via a swivel joint 28. A discharge funnel 29 is attached to the front end of the vibrating frame 9.

In FIG. 3, in its horizontal position in the vibrating frame 9, the tilting frame 19 is shown by solid lines. By extending the hydraulic cylinder 26, the tilting frame 19—and hence the container 21 mounted in it—is tilted upward about the swivel joint 28. The upper end position, which corresponds to the fully extended hydraulic cylinder 26, is indicated in FIG. 3 with dot-dashed lines. The position of the hydraulic cylinder 26 is characterized in this position by its axis 26'.

By gradually raising the tilting frame 19 with the container 21 while constantly vibrating the vibrating frame 19—and hence also the container 21—dosed delivery of the piece goods with which the container 21 is filled is achieved over the upper edge of the container 21 into the discharge funnel 29. Since the discharge funnel 29 likewise vibrates, this produces a dosed conveying of the parts of the container 21, possibly also preferred for singularized delivery.

With the devices illustrated, it is possible to save one whole work process when handling the parts. Whereas in the known technique the transport containers have been emptied and parts have been transferred into a delivery device in order to deliver them to a production device, with the device according to the present invention the delivery can take place directly out of the container 21.

What is claimed is:
1. A device for unloading a container loaded with bulk piece goods, which comprises:
    (a) a stationary machine frame;
    (b) a substantially horizontal vibrating frame which is movable with respect to said machine frame and is provided with an outlet side for unloading said bulk piece goods;
    (c) means for connecting said machine frame and said vibrating frame;
    (d) a receiving platform which is provided on said vibrating frame and includes means for securing said container on said receiving platform and;
    (e) a low-frequency vibration drive fastened to the underside of said vibrating frame and arranged at a diagonal with respect to said substantially horizontal vibrating frame such that said vibrating frame and container are subjected to diagonal vibration pulses which direct the bulk piece goods towards said outlet side of said vibrating frame; wherein
    (f) said vibration drive continuously regulates the vibration pulses in a predetermined amplitude range and limits the vibration pulses to a vertical acceleration component of about 2 g.

2. A device as recited in claim 1, wherein said low-frequency vibration drive has a vibration frequency between about 10 Hz and 20 Hz.

3. A device as recited in claim 2, further comprising means for varying the vibration frequency as a function of the effective mass of said container.

4. A device as recited in claim 3, wherein said vibration frequency-varying means adjusts the vibration frequency to the resonant frequency of the effective mass formed by said vibrating frame and said container.

5. A device as recited in claim 1, wherein said vibration drive comprises a two-mass vibrator fastened to the vibrating frame.

6. A device as recited in claim 1, wherein said vertical acceleration component is about g.

7. A device as recited in claim 1, wherein said connecting means comprises a first guide rod having one end rotatably mounted on said machine frame and a second guide rod having one end fastened to said vibrating frame, wherein the other ends of said first and second guide rods are connected via a double-joint block.

8. A device for unloading a container loaded with bulk piece goods, which comprises:
   (a) a stationary machine frame;
   (b) a substantially horizontal vibrating frame which is movable with respect to said machine frame and is provided with an outlet side for unloading said bulk piece goods;
   (c) means for connecting said machine frame and said vibrating frame;
   (d) a low-frequency vibration drive fastened to the underside of said vibrating frame and arranged at a diagonal with respect to said substantially horizontal vibrating frame such that said vibrating frame and container are subjected to diagonal vibration pulses which direct the bulk piece goods toward said outlet side of said vibrating frame, wherein said vibration drive continuously regulates the vibration pulses in a predetermined amplitude range and limits the vibration pulses to a vertical acceleration component of about 2 g;
   (f) a tilting frame arranged in said vibrating frame;
   (g) a hydraulic cylinder connected to said tilting frame and said vibrating frame for tilting said tilting frame with respect to said vibrating frame about a swivel joint fastened to said vibrating frame; and
   (h) a receiving platform which is provided on said tilting frame and includes means for securing said container on said receiving platform.

\* \* \* \* \*